United States Patent [19]

Yokomachi et al.

[11] Patent Number: 4,974,702
[45] Date of Patent: Dec. 4, 1990

[54] SWASH PLATE TYPE COMPRESSOR WITH THRUST BEARING LUBRICATOR

[75] Inventors: Naoya Yokomachi; Hayato Ikeda; Norihiko Nakamura; Katsunori Kawai; Masahiro Sawada; Shinichi Ishihara, all of Kariya, Japan

[73] Assignee: Kabushiki Kaisha Tyoda Jidoshokki Seisakusho, Aichi, Japan

[21] Appl. No.: 470,985

[22] Filed: Jan. 24, 1990

[30] Foreign Application Priority Data

Jan. 27, 1989 [JP] Japan ................................ 1-8537[U]
Jan. 27, 1989 [JP] Japan ................................ 1-8538[U]
Jan. 27, 1989 [JP] Japan ................................ 1-8539[U]

[51] Int. Cl.⁵ .............................................. F01M 1/00
[52] U.S. Cl. .................................... 184/6.17; 417/269
[58] Field of Search ............... 184/6.16, 6.17, 11.2; 92/71, 153; 417/269, 222

[56] References Cited

U.S. PATENT DOCUMENTS 4,401,414 8/1983 Ishizuka ............................. 417/269

FOREIGN PATENT DOCUMENTS 49-108610 10/1974 Japan .
56-29080 3/1981 Japan .

OTHER PUBLICATIONS

Japan Unexamined Utility Model Publication (KOKAI) No. 59-107074, 07/1984.

*Primary Examiner*—Ira S. Lazarus
*Assistant Examiner*—Alan B. Cariaso
*Attorney, Agent, or Firm*—Burgess, Ryan & Wayne

[57] ABSTRACT

A thrust bearing lubricating system of a swash plate type compressor having a main lubricating oil passageway bored in the center of a drive shaft on which a swash plate is mounted to be axially supported by a pair of front and rear thrust bearings, an oil pumping mechanism for pumping lubricating oil from an oil sump in the bottom of a cylinder block assembly and supplying the lubricating oil into the main lubricating oil passageway, and at least front and rear radial branch lubricating oil passageways formed in the drive shaft to be communicated with the main lubricating oil passageway and to allow spouting of the lubricating oil toward the front and rear thrust bearings, the front and rear radial branch lubricating oil passageways having different cross-sectional areas from one another to equalize an amount of lubricating oil supplied to both thrust bearings.

8 Claims, 14 Drawing Sheets

Fig. 5
Fig. 7
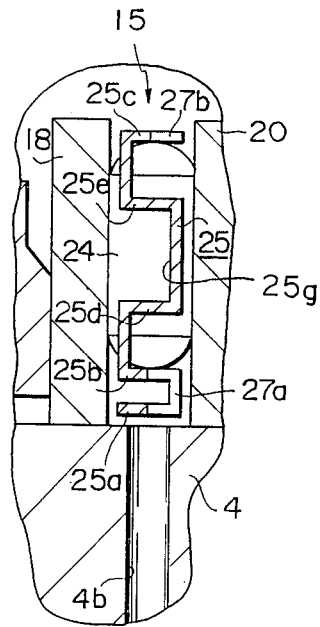
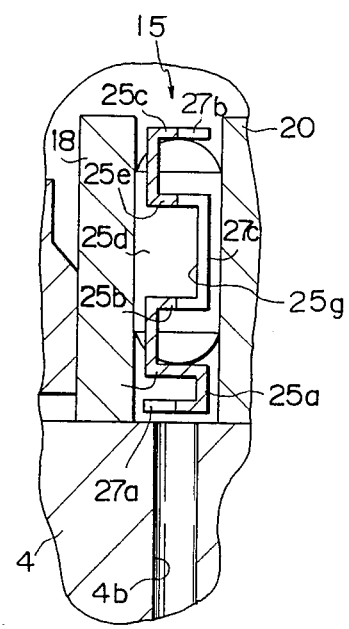

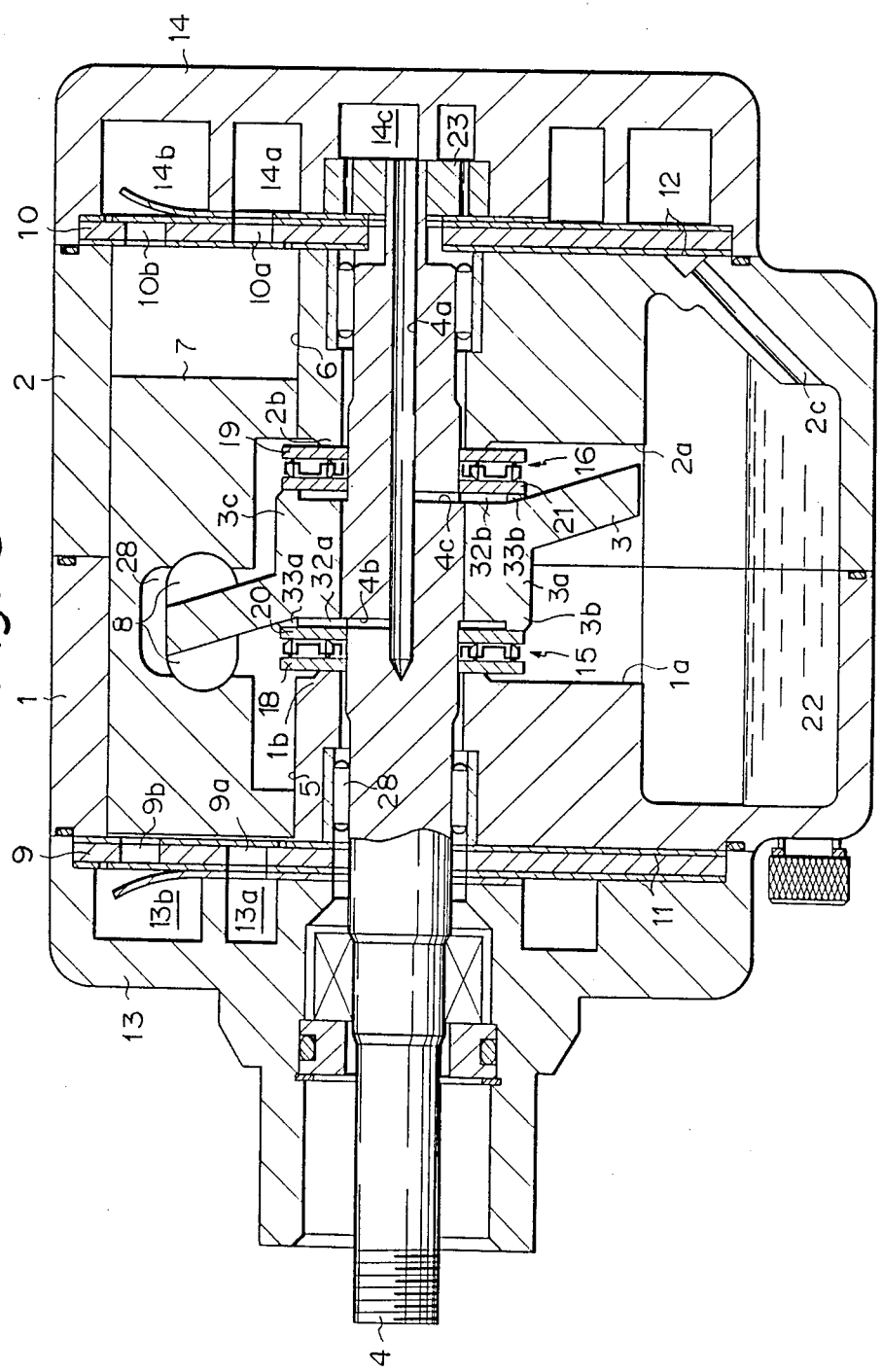

SWASH PLATE TYPE COMPRESSOR WITH THRUST BEARING LUBRICATOR

BACKGROUND OF THE INVENTION

1. Field of the Invention

The present invention relates to a swash plate type refrigerant compressor of the type wherein a swash plate is held on and rotated by a drive shaft to reciprocate compressing pistons within cylinder bores formed in a pair of front and rear cylinder blocks, and more particularly relates to a lubricating system accommodated in the swash plate type compressor for sufficiently lubricating thrust bearings supporting the swash plate against a thrust force acting on the swash plate.

2. Description of the Prior Art

Japanese Unexamined ( Kokai ) Patent Publication No. 49-108610 discloses a swash plate type refrigerant compressor provided therein with a lubricating system for lubricating front and rear thrust bearings supporting a swash plate against a thrust load within a swash plate chamber formed in the assembly of a pair of cylinder blocks. In the lubricating system of the known swash plate type refrigerant compressor, lubricating oil passageways are separately arranged from refrigerant circuits to avoid a reduction in the refrigerating efficiency of an air-conditioning circuit in which the compressor is accommodated, caused by an attachment of the lubricating oil to an evaporator of the air-conditioning circuit Namely, in the known compressor, a drive shaft for rotating the swash plate is operatively connected to a gear pump mechanism for pumping the lubricating oil from an oil sump arranged beneath the swash plate chamber to allow the lubricating oil to flow into a main lubricating oil passageway axially bored in the drive shaft. The main lubricating oil passageway of the drive shaft is fluidly communicated with a pair of spaced apart branch lubricating oil passageways of the drive shaft, through which the lubricating oil of the main lubricating oil passageway is forcibly supplied to the afore-mentioned front and rear thrust bearings. The lubricating oil flowing out of the branch lubricating oil passageways radially formed in the drive shaft comes into contact with the inner circumference portions of the thrust bearings upon rotation of the drive shaft to thereby lubricate the thrust bearing. The lubricating oil further lubricates contacting portions of the swash plate and shoe elements, and thereafter, returns to the oil sump beneath the swash plate chamber In the above-mentioned lubricating system of the known swash plate type refrigerant compressor, the lubricating oil is subjected to a gradual pressure drop while flowing inside the main oil passageway of the drive shaft from the starting position thereof adjacent to the gear pump mechanism toward an inner position thereof, and therefore, an amount of the lubricating oil flowing out of the branch lubricating oil passageway arranged to be communicated with the inner position of the main lubricating oil passageway must become less than that of the lubricating oil flowing out of the other branch lubricating oil passageway located close to the starting position of the main lubricating oil passageway, when both lubricating oil branch passageways are bored to have an equal cross-sectional area thereof. Accordingly, the lubrication of the front thrust bearing by the lubricating oil flowing out of the innermost arranged branch lubricating oil passageway must become insufficient compared with that of the rear thrust bearing. To overcome this problem, if the cross-sectional areas of the main and branch lubricating oil passageways are increased to permit a sufficient amount of lubricating oil to flow therethrough, the diameter of the drive shaft must be accordingly increased, to avoid a lowering of the mechanical strength of the drive shaft, per se, and as a result, the entire size of the compressor must become large.

On the other hand, in the above-mentioned lubricating system of the known swash plate type refrigerant compressor, when the lubricating oil flows out of the above-mentioned radially arranged branch lubricating oil passageways of the drive shaft, it is often spouted toward inner faces of rollers of the front and rear thrust bearings and the inner circumference of a retainer ring element retaining the rollers, and therefore, when the lubricating oil is reflected from the thrust bearing, the lubricating oil is apt to flow along the outer surface of the drive shaft until reaching suction and/or discharge chambers of the refrigerant circuit of the compressor. Accordingly, when the lubricating oil flows into the refrigerant circuit of the compressor, it will adhere to the evaporator of the air-conditioning circuit, to cause a lowering of the refrigerating efficiency of the air-conditioning circuit, and in the whole amount of oil reserved in the oil sump of the compressor, per se. The latter problem will result in an insufficient lubrication, of the thrust bearings and other elements.

Furthermore, since the above-mentioned retainer ring element of each of the front and rear thrust bearings is formed to be a non-planar annular element having many bends thereof with respect to a plane perpendicular to the axis of the drive shaft, and containing therein the rollers of each thrust bearing to retain the rollers and to reinforce the physical strength thereof, and since the retainer ring element has outermost and innermost reinforcing rims, the smooth flow of the lubricating oil flowing out of the branch lubricating oil passageways to inside the thrust bearings via narrow spacings between the swash plate and inner end walls of the cylinder blocks forming the swash plate chamber is prevented by the non-planar retainer ring elements Accordingly, the lubrication of the thrust bearings must again become insufficient.

SUMMARY OF THE INVENTION

An object of the present invention is obviate the drawbacks encountered by the lubricating system of the prior art swash plate type refrigerant compressor.

Another object of the present invention is to provide a swash plate type refrigerant compressor provided with a lubricating system accommodated therein and capable of sufficiently lubricating thrust bearings supporting a swash plate and withstanding a thrust force acting on the swash plate, to thereby prolong the life of the thrust bearings and the compressor, per se.

A further object of the present invention is to provide an improved lubricating system of a swash plate type refrigerant compressor, capable of equally lubricating front and rear thrust bearings of the compressor during the running of the swash plate type refrigerant compressor.

A still further object of the present invention is to provide a thrust bearing lubricating system of a swash plate type refrigerant compressor, capable of sufficiently lubricating thrust bearing while preventing a leakage of lubricating oil from a lubricating oil passageways into refrigerant circuits of an air-conditioning circuit accommodating therein the compressor, to thereby prevent a lowering of the refrigerating efficiency.

In accordance with the present invention, there is provided a swash plate type refrigerant compressor which comprises:

a cylinder block assembly having front and rear ends axially spaced apart from one another, and including therein a plurality of cylinder bores circumferentially arranged around a predetermined axis of the assembly, an axially centrally arranged swash plate chamber, and an oil sump;

a drive shaft rotatably supported in the cylinder block assembly, and having a rotating axis corresponding to the predetermined axis of the cylinder block assembly, and an axially bored main lubricating oil passageway extended substantially along the rotating axis;

a plurality of reciprocating double-headed pistons slidably fitted in the plurality of cylinder bores, and capable of implementing a pumping-in of a refrigerant gas from suction chambers into the cylinder bores, compressing of the refrigerant gas and a discharging of the refrigerant gas after compression from the cylinder bores toward discharge chambers;

a swash plate mounted on the drive shaft to be rotated with the drive shaft for reciprocating the plurality of double-headed pistons;

a pair of front and rear thrust bearings mounted around the drive shaft and seated on axially confronting inner wall portions of the swash plate chambers of the cylinder block assembly, the pair of front and rear thrust bearings axially supporting the swash plate against a thrust force acting on the swash plate during the rotation thereof;

an oil pumping mechanism operatively connected to the drive shaft to pump a lubricating oil from the oil sump, and to flow the pumped lubricating oil into the main lubricating oil passageway of the drive shaft when driven by the drive shaft and;

a thrust bearing lubricating system having a unit for supplying the pair of front and rear thrust bearings with the lubricating oil supplied from the main lubricating oil passageway of the drive shaft, the thrust bearing lubricating system comprising:

at least one first branch lubricating oil passageway bored in the drive shaft at a position corresponding to the front thrust bearing to be communicated with the main lubricating oil passageway, to thereby permit the lubricating oil to be spouted therethrough from the main lubricating oil passageway toward the front thrust bearing;

at least one second branch lubricating oil passageway bored in the drive shaft at a position corresponding to the rear thrust bearing to be communicated with the main lubricating oil passageway, to thereby permit the lubricating oil to be spouted therethrough from the main lubricating oil passageway toward the rear thrust bearing, and;

an arrangement wherein the first and second branch lubricating passageways axially remote from the oil pumping mechanism have different cross-sectional ares from one another and are adjusted to equalize an amount of the lubricating oil spouted from the first and second branch lubricating oil passageways with.

BRIEF DESCRIPTION OF THE DRAWINGS

The other objects, features and advantages of the present invention will be made apparent from the description of preferred embodiments thereof with reference to the accompanying drawings wherein:

FIG. 5 is a cross-sectional view taken along the line V—V of FIG. 4;

FIG. 7 is a cross-sectional view taken along the line VI—VII of FIG. 6;

FIG. 8 is a longitudinal cross-sectional view of a swash plate type refrigerant compressor according to another embodiment of the present invention;

DESCRIPTION OF THE PREFERRED EMBODIMENTS

Figure 1:
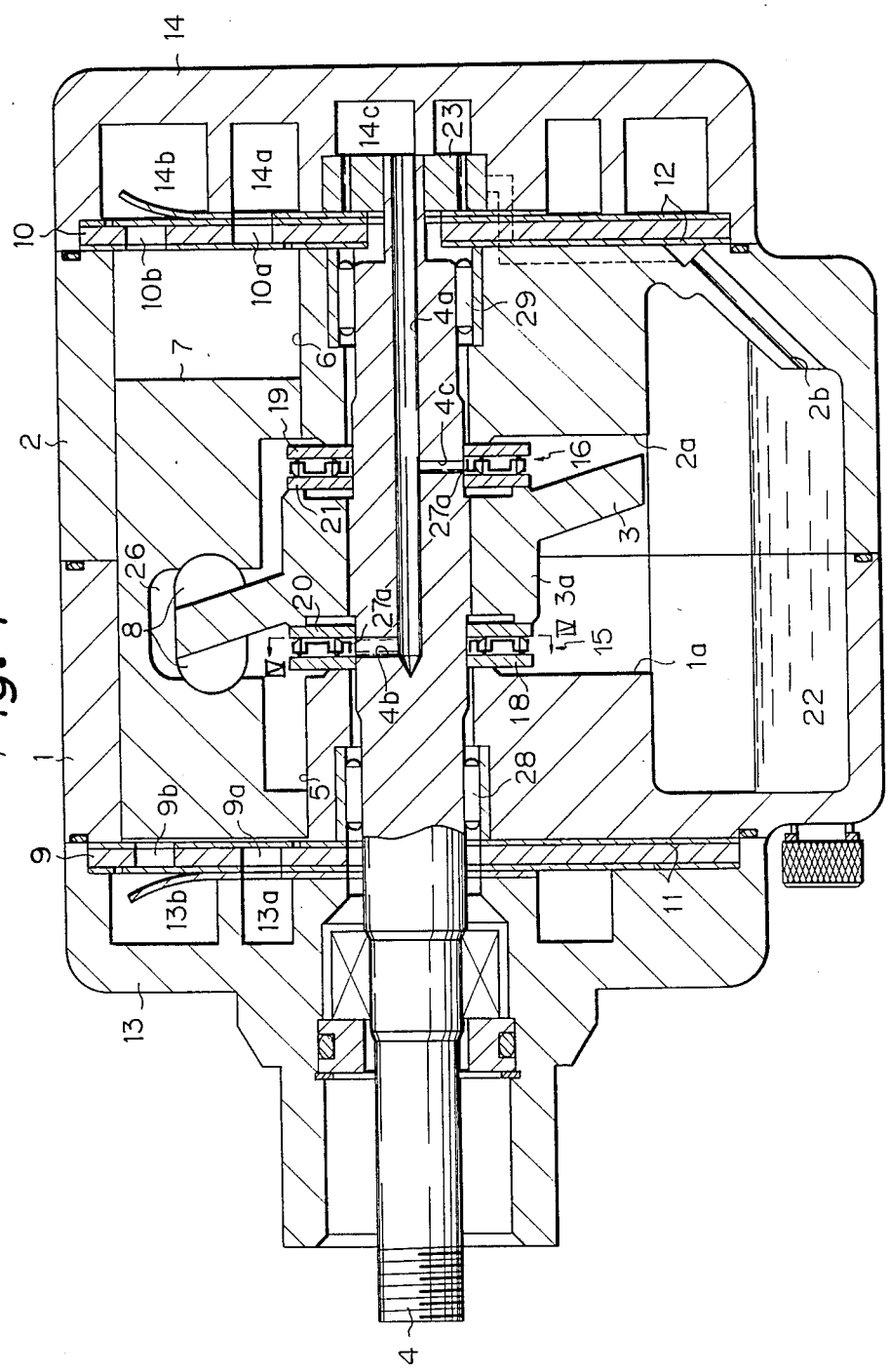
FIG. 1 is a longitudinal cross-sectional view of a swash plate type compressor accommodating therein a thrust bearing lubricating system according to an embodiment of the present invention.
Figure 2:
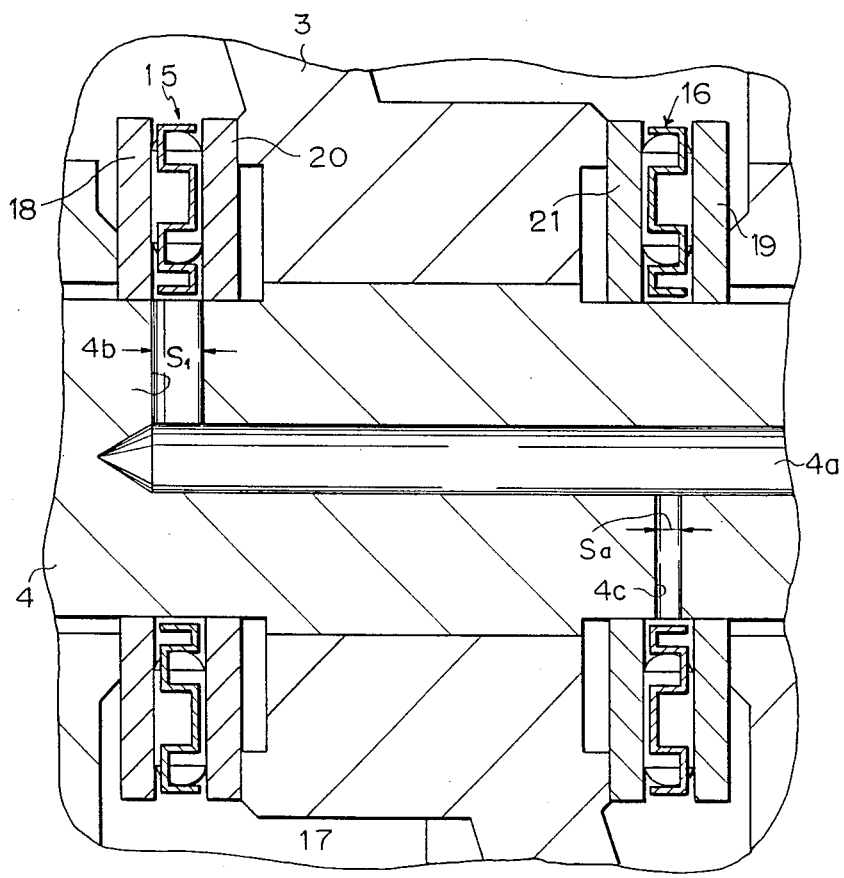
FIG. 2 is a partial enlarged cross-sectional view of a part of the compressor of FIG. 1, illustrating the featured construction of the thrust bearing lubricating system.

Referring to FIGS. 1 and 2, a swash plate type refrigerant compressor has a front cylinder block 1 and a rear cylinder block 2 axially connected together to form a cylinder block assembly having a predetermined axis, and front and rear ends thereof sealingly closed by a front housing 13 and a rear housing 14. The cylinder block assembly and the front and rear housings 13 and 14 are combined together by suitable screw bolts (not shown), via front and rear valve plates 9 and 10, and front and rear valve forming sheets 11 and 12. The cylinder block assembly supports a drive shaft 4 to be rotatable about the predetermined axis of the cylinder block assembly via front and rear radial bearings 28 and 29, fitted in the front and rear cylinder blocks, respectively. A swash plate 3 is mounted on the drive shaft 4 to be rotated together with the drive shaft. The cylinder block assembly has a plurality of cylinder bores 5 formed in the front cylinder block 1 equiangularly arranged around the rotating axis of the drive shaft 4, and a plurality of cylinder bores 6 formed in the rear cylinder block 2 equiangularly arranged around the rotating axis of the drive shaft 4. The cylinder bores 5 and 6 are axially aligned to be extended through the whole length of the cylinder block assembly so that a plurality of double-headed compressing pistons 7 are reciprocatingly slidably fitted in the respective axial cylinder bores 5 and 6. Each of the double-headed pistons 7 has a radial recess 26 formed at a central portion thereof to permit the swash plate 3 to pass therethrough via a pair of semi-spherical shoes 8. Namely, when the swash plate 3 is rotated by the drive shaft 4, the double-headed pistons 7 are axially reciprocated in the corresponding axial cylinder bores 5 and 6 to carry out a suction, compression and discharge of a refrigerant gas. The swash plate 3 is rotatably housed in a swash plate chamber 17 formed at an axially central portion of the cylinder block assembly, and axially supported by a pair of front and rear thrust bearings 15 and 16 intervened between axially opposing inner end walls 1a and 2a of the swash plate chamber 17 and end faces of a cylindrical boss 3a of the swash plate 3.

The compressor has suction chambers 13a and 14a for receiving the refrigerant gas before compression from an exterior air-conditioning circuit, and discharge chambers 13b and 14b for receiving the compressed refrigerant gas discharged from the cylinder bores 5 and 6 before supplying same toward the exterior air-conditioning circuit. These chambers 13a, 14a, 13b and 14b are defined inside the front and rear housings 13 and 14 so that the suction chambers and the discharge chambers are isolated from one another by wall portions of the front and rear housings 13 and 14. When the refrigerant gas is introduced from the air-conditioning circuit into the suction chambers 13a and 14a during the operation of the compressor, the gas is in turn pumped into the cylinder bores 5 and 6 via suction ports 9a and 10a of the front and rear valve plates 9 and 10. The refrigerant gas after compression is discharged from the cylinder bores 5 and 6 into the discharge chambers 13b and 14b, via discharge ports 9b and 10b of the valve plates 9 and 10, and then supplied to the air-conditioning circuit.

The cylinder block assembly of the compressor has an oil sump 22 formed therein and located beneath and communicated with the swash plate chamber 17, to stock an appropriate amount of lubricating oil. The oil sump 22 is arranged to be isolated from the refrigerant circuits inside the compressor, i.e., the suction and discharge chambers 13a, 14a, 13b, and 14b. The lubricating oil in the oil sump 22 is pumped by a gear pump mechanism 23 housed in a pump chamber 14c in the rear housing 14 and operatively connected to the rear end of the drive shaft 4. Therefore, the pump mechanism 23 is driven by the drive shaft 4 to draw the lubricating oil from the oil sump 22 into the pump chamber 14c via an oil passageway 2b.

A main lubricating oil passageway 4a is bored in the drive shaft 4 to extend axially along the rotating axis of the drive shaft 4, and communicated at outermost end thereof with the pump chamber 14c of the rear housing 14. An innermost end of the main lubricating oil passageway 4a is extended to a position approximately corresponding to the front thrust bearing 15, and is communicated to a first branch lubricating oil passageway 4b radially bored in the drive shaft 4 to open toward the front thrust bearing 15. Therefore, when the lubricating oil is supplied from the pump chamber 14c into the main lubricating oil passageway 4a under the pumping action of the gear pump mechanism 23, a part of the lubricating oil is spouted from the main lubricating oil passageway 4a through the branch lubricating oil passageway 4b toward the inner circumference of the front thrust bearing 15. The main lubricating oil passageway 4a is also communicated with a second branch lubricating oil passageway 4c radially bored in the drive shaft 4 to open toward the rear thrust bearing 16. Therefore, a part of the lubricating oil is spouted from the main lubricating oil passageway 4a through the second branch lubricating oil passageway 4c toward the inner circumference of the rear thrust bearing 16.

When it is assumed that an oil pressure at the connection of the main and branch lubricating oil passageways 4a and 4b is "$P_1$", an oil pressure at the connection of the main and branch lubricating oil passageways 4a and 4c is "$P_2$", the coefficient of a flow of the lubricating oil in the branch lubricating oil passageway 4b is "$k_1$", the coefficient of a flow of the lubricating oil in the branch lubricating oil passageway 4c is "$k_2$", a flow amount of the lubricating oil per unit time in the branch lubricating oil passageway 4b is "$Q_1$", and a flow amount of the lubricating oil per unit time in the branch lubricating oil passageway 4c is "$Q_2$", the following equations (1) and (2) with respect to "$Q_1$" and "$Q_2$" can be obtained.

$$Q_1 = k_1 \cdot P_1 \qquad (1)$$

$$Q_2 = k_2 \cdot P_2 \qquad (2)$$

When it is assumed that the coefficient of a flow of the lubricating oil in the main lubricating oil passageway 4a is "$k_o$", a flow amount of the lubricating oil per unit time in the portion of the main lubricating oil passageway 4a between the first and second branch lubricating oil passageways, i.e., the flow amount "$Q_1$" in the branch lubricating oil passageway 4b is expressed by the following equation (3).

$$Q_1 = k_o \cdot (P_1 - P_2) \qquad (3)$$

From the equations (1) through (3), the equation (4) below is obtained.

$$Q_2/Q_1 = k_2 \cdot [1 + (k_1/k_0)] / k_1 \qquad (4)$$

Since both branch lubricating oil passageways 4b and 4c has an equal length, if a cross-sectional area "$S_1$" of the branch lubricating oil passageways 4b is equal to the "$S_2$" of the branch lubricating oil passageways 4c, the two coefficients of the flow of the lubricating oil "$k_1$" and "$k_2$" in both branch lubricating oil passageways 4b and 4c are the same. Accordingly, if $k_1 = k_2$, the above equation (4) can be expressed by the equation (5) below.

$$Q_2/Q_1 = 1 + (k_1/k_0) \qquad (5)$$

In accordance with the above equation (5), the value "$Q_2/Q_1$" is larger than 1.0, and therefore $Q_1$ is not equal to $Q_2$.

To make the value of "$Q_2/Q_1$" of the equation (4) equal to 1.0, the equation (6) below must be satisfied.

$$k_1 : k_2 = 1 + (k_1/k_0) : 1 \qquad (6)$$

Namely, from the above equation (6), the necessary condition is $k_1 > k_2$. This means that the cross-sectional area "S₁" of the branch lubricating oil passageway 4b must be larger than the "S₂" of the branch lubricating oil passageway 4c. If the cross-sectional area "S₁" of the branch lubricating oil passageway 4b is made different from the "S₁" of the branch lubricating oil passageway 4c, the respective amounts of flow "Q₁" and "Q₂" of the lubricating oil in the branch lubricating oil passageways 4b and 4c, i.e., the amounts of lubricating oil spouted from the two branch lubricating oil passageways 4b and 4c become substantially equal to one another. Therefore, the front and rear thrust bearings 15 and 16 are lubricated by an equal amount of lubricating oil, respectively, and therefore, the lubrication of both thrust bearings 15 and 16 is equalized Accordingly, if one of the two thrust bearings 15 and 16 is lubricated by an appropriate amount of lubricating oil, the other can be also appropriately lubricated, and as a result, both front and rear thrust bearings 15 and 16 can be set in a constant and appropriate lubricating condition during the operation of the swash plate type refrigerant compressor. Therefore, a long life of the front and rear thrust bearings 15 and 16 is guaranteed.

If the above-mentioned condition with respect to the cross-sectional areas of the two branch lubricating oil passageways 4b and 4c, i.e., the diameters of the two branch lubricating oil passageways 4b and 4c is satisfied, it may be also possible to reduce both diameters of the two passageways 4b and 4c to the smallest possible, as long as the two thrust bearings 15 and 16 are appropriately lubricated, and accordingly, the diameter of the main lubricating oil passageway 4a also may be set to the smallest possible suitable for supplying the smallest amount of lubricating oil necessary for achieving an appropriate lubrication of the front and rear thrust bearings. As a result, it is possible to maintain a sufficient mechanical strength of the drive shaft 4 without increasing the diameter thereof. Thus, an increase in the whole size of the compressor body can be avoided.

Figure 3:
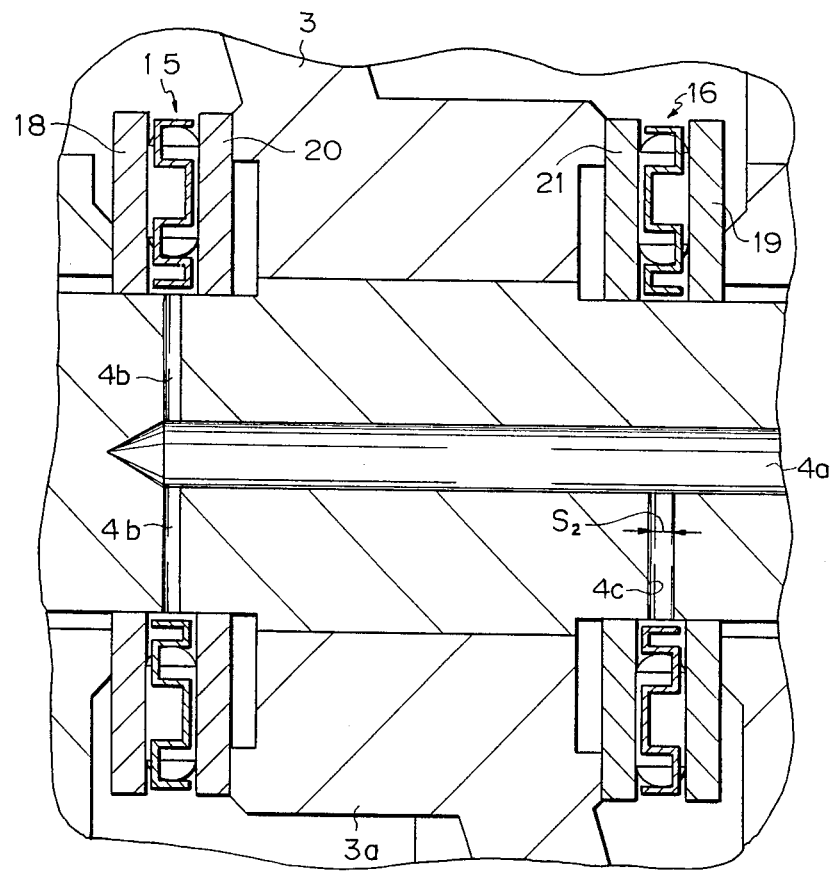
FIG. 3 is a partial enlarged cross-sectional view similar to FIG. 2, but illustrating a different thrust bearing lubricating system capable of being accommodated in the compressor of FIG. 1.

FIG. 3 illustrates a modified arrangement of the branch lubricating oil passageways 4b and 4c of FIG. 2. Namely, in the arrangement of FIG. 3, the amounts of flow of the lubricating oil "Q₁" and "Q₂" in these branch passageways are equalized by providing a plurality of first branch lubricating oil passageways 4b instead of increasing the diameter of the single first branch lubricating oil passageway 4b. This arrangement of FIG. 3 can also contributes to the applying of an equal lubrication to the front and rear thrust bearings.

In addition to the arrangement of the thrust bearing lubricating system of the swash plate type refrigerant compressor, illustrated in FIGS. 1 and 2, the construction of each of the front and rear thrust bearings 15 and 16 preferably should be improved, to obtain a good lubrication inside the thrust bearing 15 and 16.

Figure 4:
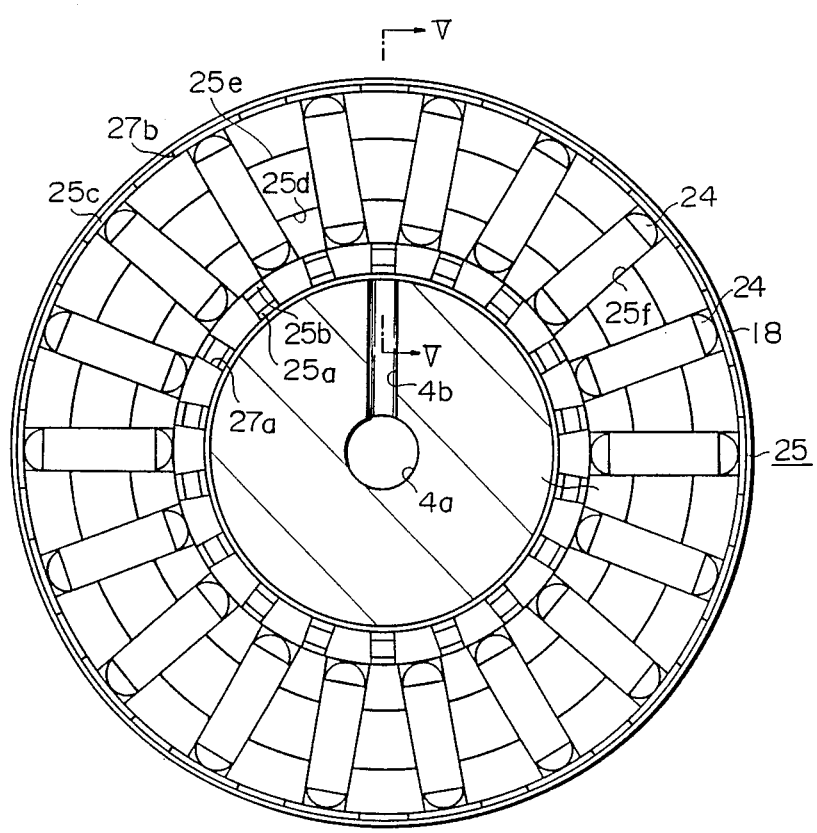
FIG. 4 is a cross-sectional view taken along the line IV—IV of FIG. 1, illustrating the featured construction of a retainer ring element of the front thrust bearing of FIG. 1.

FIGS. 4 and 5 typically illustrate the construction of the thrust bearing 15 accommodated in the compressor of FIG. 1. Namely, the thrust bearing 15 includes a plurality of rollers 24 equiangularly arranged along a circle lying in a plane perpendicular to the axis of the drive shaft 4, a retainer ring element 25, and a pair of thrust races 18 and 20. As best shown in FIG. 5, the retainer ring element 25 non-separably retaining the rollers 24 is a generally annular and non-planar member having a cranked shape including therein a plurality of bends at a right angle, respectively when viewed along a radial cross-sectional of the element 25. The radially inner end of the retainer ring element 25 has a pair of radially spaced reinforcing inner and outer rims 25a and 25b, and the radially outer end of the retainer ring element 25 has a single rim 25c extending in a direction reverse to the direction of the inner rim 25a in FIG. 5. The retainer ring element 25 also has radially spaced inner and outer ribs 25d and 25e connected to one another by radial ribs 25g, and a plurality of circumferentially spaced radial retainer pockets 25f in which the respective rollers 24 are non-separably received. The inner end of the retainer ring element 25 is provided with a plurality of circumferentially spaced inlet cuts 27a formed in the reinforcing inner and outer rims 25a and 25b to introduce the lubricating oil into the retainer pockets 25f. The outer end of the retainer ring element 25 is provided with a plurality of circumferentially spaced outlet cuts 27b formed in the outer reinforcing rim 25c to be in alignment with the inlet cuts 27a.

It should be understood that the rear thrust bearing 16 has a pair of thrust races 19 and 21, and a plurality of rollers non-separably received in a retainer ring element having a construction similar to the retainer ring element 25 of the front thrust bearing 15. Therefore, a description of the operation of the front thrust bearing 15 will be typically provided hereinbelow.

When the drive shaft 4 is rotated, the lubricating oil is continuously spouted from the branch lubricating oil passageway 4b toward the inner end of the front thrust bearing 15 rotating at a speed corresponding to one half of the rotating speed of the drive shaft 4. Therefore, the lubricating oil is brought into contact with the reinforcing inner rim 25a. The reinforcing inner and outer rims 25a and 25b of the retainer ring element 25, per se, function to prevent the lubricating oil from being introduced toward the rollers 24 received in the retainer pockets 25f, due to a fundamental design requirement such that, since the whole size of the compressor body should be as small as possible, to be suitable for being mounted in a narrow space such as an engine compartment of a car, an axial spacing between the thrust races 18 and 20 of the thrust bearing 15 is made as small as possible. However, in the present embodiment of the thrust bearing 15, since the inner and outer rims 25a and 25b are provided with the inlet cuts 27a, the lubricating oil is easily introduced into a portion extending between the two reinforcing rims 25a and 25b and the inner rib 25d of the retainer ring element 25 through the inlet cuts 27a. Namely, the lubricating oil is easily brought into contact with inner portions of respective rollers 24, and then the lubricating oil is permitted to gradually wet the entire surfaces of the rollers and the thrust races 18 and 20 during the rolling contact of the rollers 24 and both thrust races 18 and 20. Therefore, the thrust bearing 15 can be sufficiently lubricated. The lubricating oil after lubrication of the thrust bearing 15 is centrifugally dispersed from the outer circumferential end of the thrust bearing 15 toward the interior of the swash plate chamber 17. At this stage, the outlet cuts 27b of the retainer ring element 25 permit the shoes 8 and the surfaces of the swash plate 3 to be splashed with and successfully lubricated by some of the dispersed lubricating oil.

Figure 6:
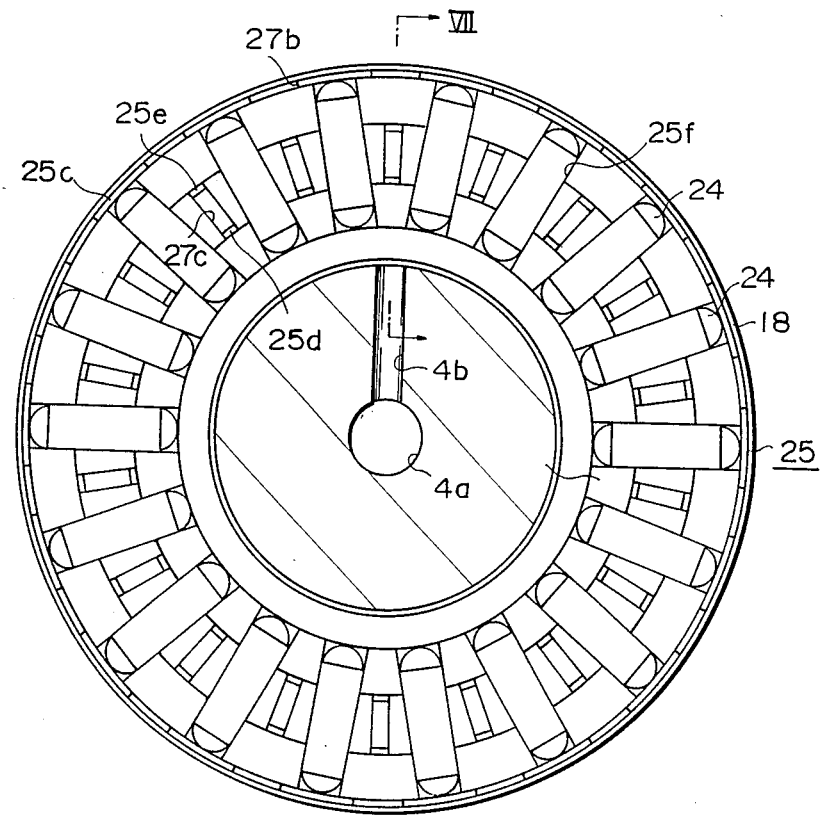
FIG. 6 is a cross-sectional view similar to FIG. 4, illustrating a different retainer ring element capable of being accommodated in the compressor of FIG. 1.

The arrangement of the inlet and outlet cuts 27a and 27b of the retainer ring element 25 is not limited to the embodiment of FIGS. 4 and 5. For example, in the arrangement of FIGS. 6 and 7, an additional cut 27c is formed in each radial rib 25g so that the lubricating oil is permitted to smoothly flow around the roller 24 from the inner circumferential end to the outer circumferential end of the retainer ring element 25. Nevertheless, the inlet cuts 27a are formed only in respective innermost rims 25a of the retainer ring element 25, to split the flow of the lubricating oil into two separate flows directed toward both of the thrust races 18 and 20 ( or 19 and 21 ) when the lubricating oil is spouted from the radial branch lubricating oil passageway 4b of the drive shaft 4 toward the inner circumferential end of the retainer ring element 25. Namely, the separate flows of the lubricating oil can sufficiently lubricate the contacting portions of the roller 24 and both of the thrust races 18 and 20. In the embodiment of FIGS. 6 and 7, the outlet cuts 27b formed in the outer reinforcing rim 25c may be omitted due to the above-mentioned slitting of the flow of the lubricating oil.

It should be understood that the arrangement of the inlet and outlet cuts 27a through 27c in the retainer ring of the front and rear thrust bearing 15 and 16, for improving the flow of the lubricating oil inside the thrust bearings, may be applied to a different swash plate type refrigerant compressor wherein the lubrication of the movable elements of the compressor, such as the thrust bearings, shoes, and a swash plate, is accomplished by an oil mist mixed with the refrigerant gas.

Figure 9:
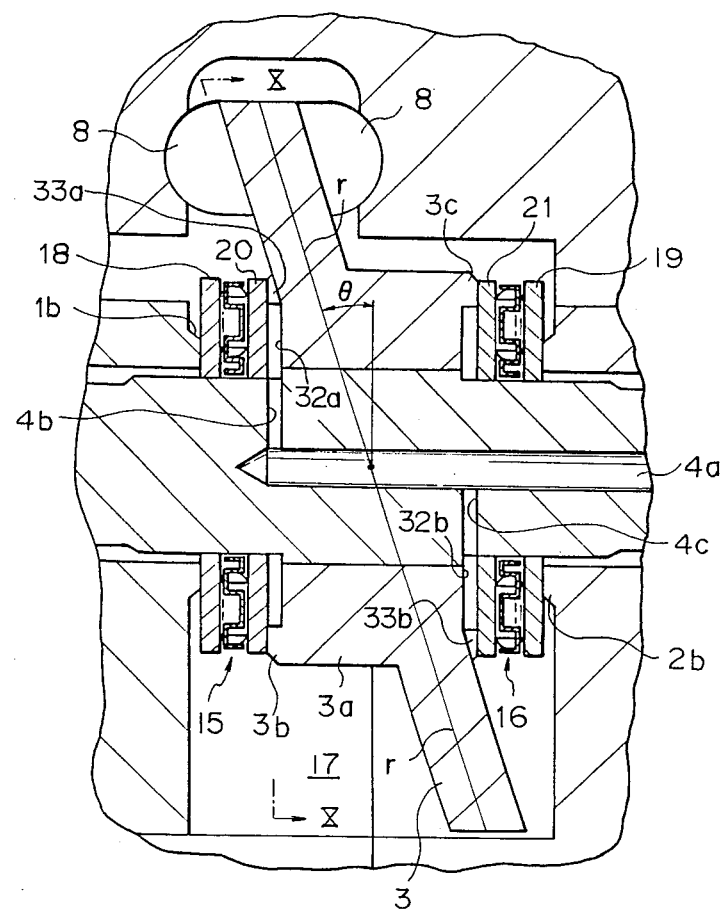
FIG. 9 is a partial enlarged cross-sectional view of a part of the compressor of FIG. 8, illustrating the featured construction of the thrust bearing lubricating system.
Figure 10:
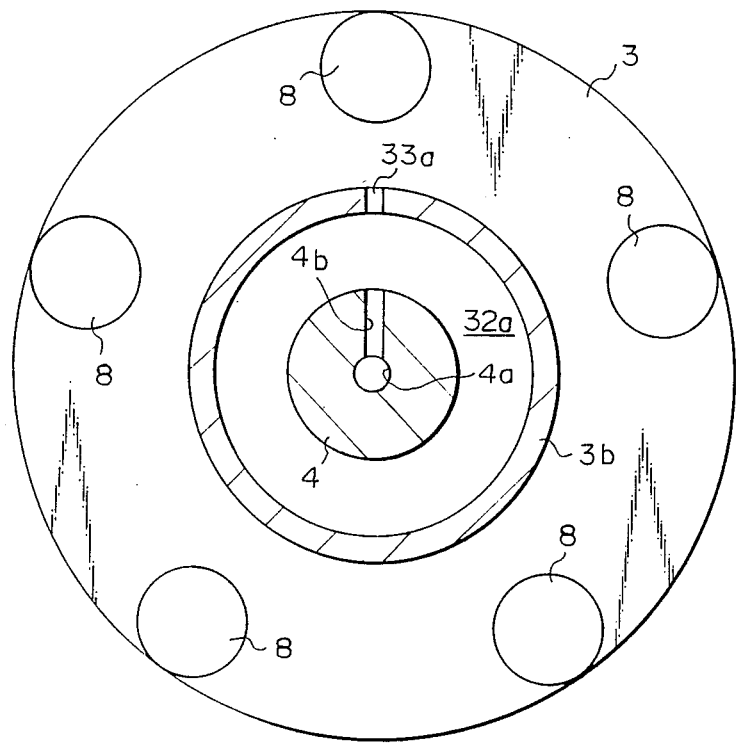
FIG. 10 is a cross-sectional view taken along the line X—X of FIG. 9.

FIGS. 8 through 10 illustrate another swash plate type refrigerant compressor with a thrust bearing lubricating system according to a different embodiment of the present invention. It should be noted, however, that the elements and parts similar to those of the embodiment of FIGS. 1 through 7 are denoted by the same reference numerals.

In the swash plate type refrigerant compressor of FIGS. 8 through 10, the suction, compression, and discharge of the refrigerant gas are carried out by the same mechanism as that of the compressor of the aforementioned embodiment, and therefore, a description hereinbelow will be concentrated to the construction and operation of the thrust bearing lubricating system accommodated in the compressor.

Referring to FIGS. 8 through 10, the annular-shape thrust races 18 through 21 are snugly fitted on the drive shaft 4. The thrust races 18 through 21 are axially supported by axial protrusions 1b and 2b provided on the inner walls 1a and 2a of the cylinder block assembly and axial protrusions 3b and 3c provided on the opposite ends of the boss 3a of the swash plate 3. The protrusions 1b and 2b of the inner walls 1a and 2a of the cylinder block assembly extend circumferentially around the drive shaft 4 along a circle having a diameter larger than that of the inner bore of each of the thrust races 18 and 19, and the protrusions 3b and 3c of the boss 3a of the swash plate 3 also extend circumferentially around the drive shaft 4, and located at positions slightly outward the outer ends of the thrust races 20 and 21, to thereby permit absorption of a small error in assembling the swash plate 3 in the swash plate chamber 17.

As clearly shown in FIGS. 8 and 9, the radial branch lubricating oil passageway 4b of the drive shaft 4 extending from the main lubricating oil passageway 4a to the surface of the drive shaft 4 opens toward an annular spacing 32a provided between one axial end of the boss 3a of the swash plate 3 and the thrust race 20 of the front thrust bearing 15. The annular spacing 32a is enclosed by the annular protrusion 3b which has a radial oil outlet 33a in the shape of a small slit as shown in FIG. 10. Therefore, when the lubricating oil pumped by the gear pump mechanism 23 is sent into the main lubricating oil passageway 4a under a pressure, a part of the oil is spouted from the main lubricating oil passageway 3a of the drive shaft 4 into the annular spacing 32a via the branch lubricating oil passageway 3b, and subsequently, the oil is pressed out of the annular spacing 32a through the oil outlet 33a into the swash plate chamber 17.

The radial branch lubricating oil passageway 4c of the drive shaft 4 also extending from the main lubricating oil passageway 4a to the surface of the drive shaft 4 opens toward an annular spacing 32b provided between the other axial end of the boss 3a of the swash plate 3 and the thrust race 21 of the rear thrust bearing 16. The annular spacing 32b is enclosed by the annular protrusion 3c which has a radial oil outlet 33b similar to the oil outlet 33a of the front thrust bearing 15. Therefore, a part of the lubricating oil spouted from the main lubricating oil passageway 4a under pressure splashes the interior of the swash plate chamber 17 after passing through the annular spacing 32b and the oil outlet 33b.

At this stage, the radial branch lubricating oil passageways 4b and 4c are located at positions where the opening of these passageways 4b and 4c are directed toward inner end portions of the opposite inclined faces of the swash plate 3. Each of the above-mentioned inner end portions is chosen to be located in a region of each inclined swash plate face where a line along a radius "r" of the swash plate is inclined at an angle substantially corresponding to the largest angle "$\theta$" (FIG. 9) of the swash plate 3. Further, the oil outlets 33a and 33b are located to be in registration with the radial branch lubricating oil passageways 4b and 4c of the drive shaft 4 as will be understood from FIG. 10. Thus, the lubricating oil spouted from the main lubricating oil passageway 4a via the branch lubricating oil passageways 4b and 4c is smoothly directed toward the oil outlets 33a and 33b through the annular spacings 32a and 32b, respectively, without being subjected to a flow resistance.

As stated above, the thrust races 18 through 21 of the front and rear thrust bearings 15 and 16 are snugly fitted on the drive shaft 4, and therefore the inner cylindrical surfaces of these thrust races 18 through 21 function to prevent the lubricating oil in the annular spacings 32a and 32b, or spouted out of the passageways 4b and 4c of the drive shaft 4 from flowing along the surface of the drive shaft 4. Therefore, a direct flow of the lubricating oil from the branch lubricating oil passageways 4b and 4c into the inside of the thrust bearings 15 and 16 is limited. Accordingly, the lubricating oil from the branch passageways 4b and 4c is smoothly directed into the annular spacings 32a and 32b, and jetted into the swash plate chamber 17 via the oil outlets 33a and 33b. The lubricating oil jetted from the oil outlets 33a and 33b is reflected by the inner end of the inclined surfaces of the swash plate 3, and therefore, a part of the reflected flow of the lubricating oil wets the front and rear thrust bearings 15 and 16, and gradually flows into spaces between the confronting thrust races 18 and 20, and 19 and 21 while gradually lubricating the two thrust bearings 15 and 16 from outside toward inside thereof. Accordingly, neither a stay of the lubricating oil within the two thrust bearings 15 and 16 nor a flow of the lubricating oil along the surface of the drive shaft 4 occur, and therefore, a non-preferable leakage of the lubricating oil from the thrust bearing lubricating system into the suction chambers 13a and 14a of the front and rear housings 13 and 14 is prevented.

The lubricating oil dispersed into the swash plate chamber 17 lubricates the contacting portions of the shoes 8 and the swash plate 3, the cylinder bores 5 and 6, and the surface of respective double-headed pistons 7 in addition to the afore-mentioned thrust bearings 15 and 16. The lubricating oil after lubricating the above-mentioned elements and parts returns from the swash plate chamber 17 to the oil sump 22. It should be appreciated that, in accordance with the present embodiment, the thrust bearing lubricating system is able to effectively prevent leakage of the lubricating oil from the swash plate chamber 17 toward the refrigerant circuit inside the compressor body, such as the suction chambers 13a and 14a, and discharge chambers 13b and 14b. Therefore, a sufficient amount of lubricating oil is constantly stored in the compressor body to apply a sufficient amount of lubrication to all movable elements and sliding contact portions of the compressor, and as a result, a long life of the compressor, per se, is guaranteed.

Figure 11:
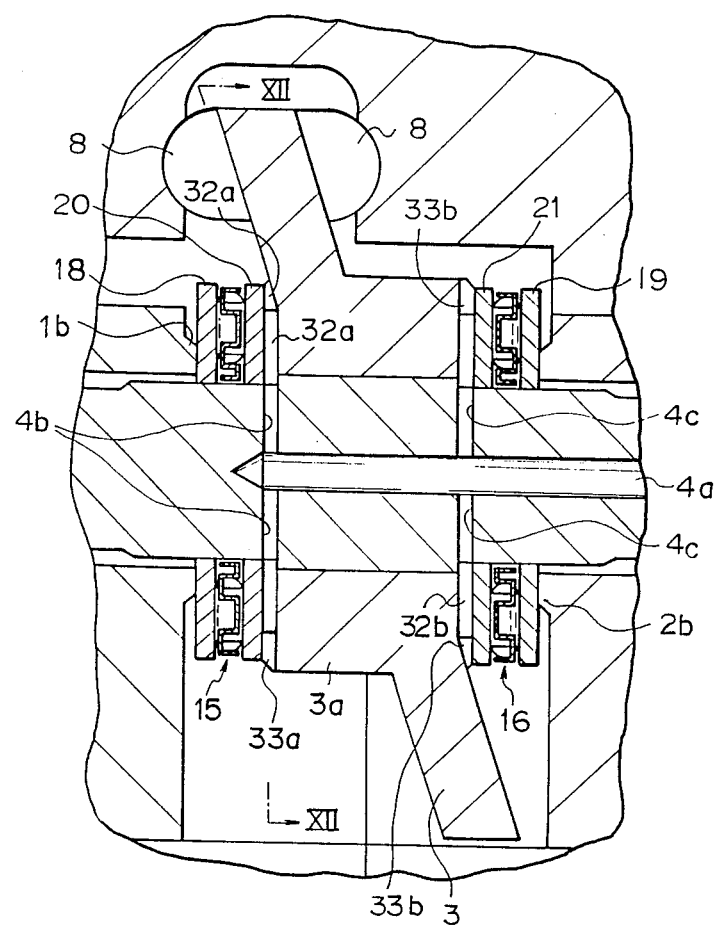
FIG. 11 is a partial enlarged cross-sectional view similar to FIG. 10, but illustrating a different thrust bearing lubricating system capable of being accommodated in the compressor of FIG. 8.
Figure 12:
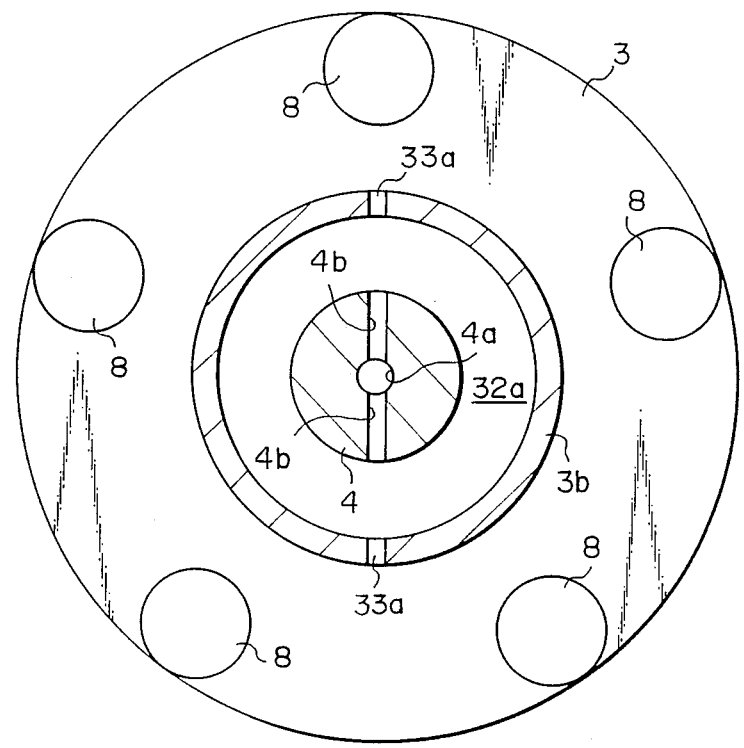
FIG. 12 is a cross-sectional view taken along the line X II—X II of FIG. 11.

The present invention is not limited to the embodiment of FIGS. 8 through 10. For example, as illustrated in FIGS. 11 and 12, the two or more radial branch lubricating oil passageways 4b and 4c of the drive shaft 4 may be provided to be in communication with the annular spacings 32a and 32b to thereby apply a more even lubrication to the front and rear thrust bearings 15 and 16, and the contacting portions of the shoes 8 and the surfaces of the swash plate 3.

Figure 13:
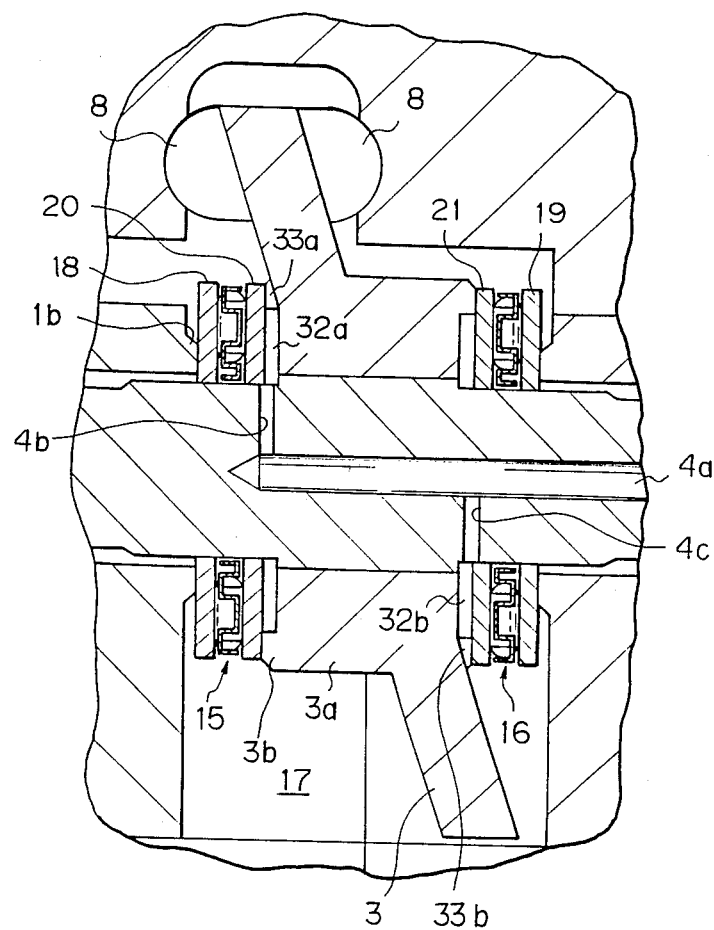
FIGS. 13 through 15 are partial enlarged cross-sectional views similar to FIG. 10, but illustrating different thrust bearing lubricating systems capable of being accommodated in the compressor of FIG. 8, respectively.
Figure 14:
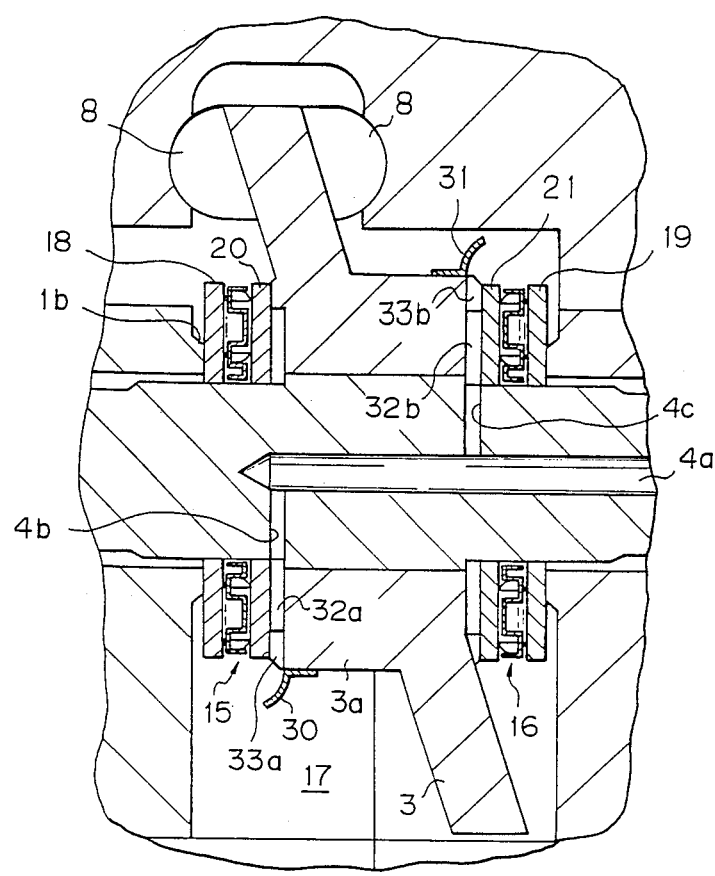

FIGS. 13 and 14 illustrate a further variation of the arrangement of the thrust bearing lubricating system wherein the radial branch lubricating oil passageways 4b and 4c are arranged to open toward both the annular spacings 32a and 32b, and the inner face of the thrust races 20 and 21 located between the thrust bearings 15 and 16 and the axial ends of the swash plate 3. This arrangement is effective for lubricating the front and rear thrust bearings 15 and 16 from the inside thereof and for preventing the lubricating oil from leaking toward the suction chambers 13a and 14a along the surface of the drive shaft 4. Furthermore, as illustrated in FIG. 14, reflector pieces 30 and 31 may be provided for the boss 3a of the swash plate 3 so that the lubricating oil jetted from the oil outlets 33a and 33b is surely reflected toward the thrust bearings 15 and 16.

Figure 15:
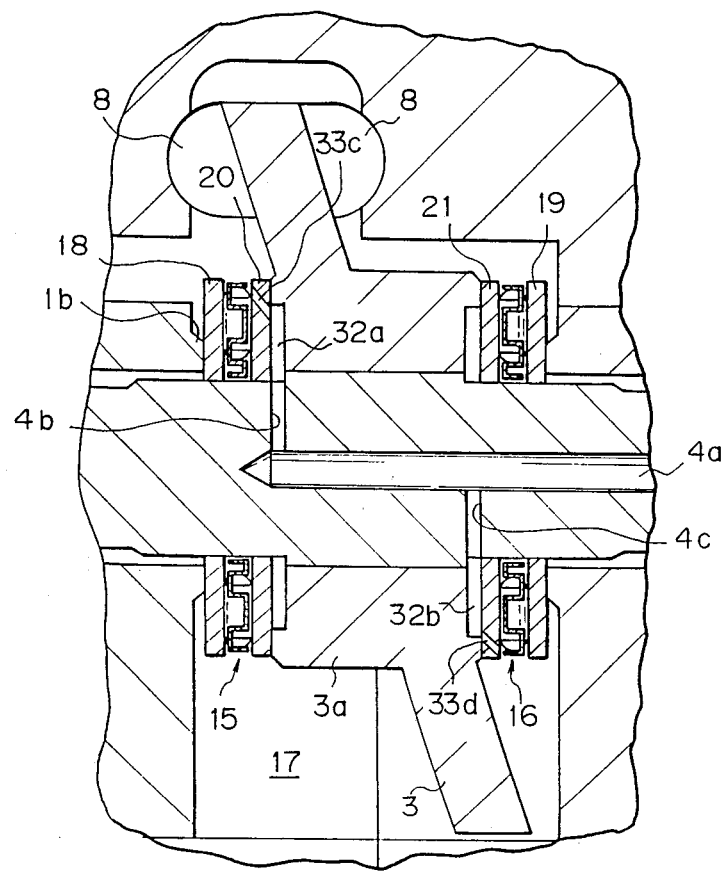

FIG. 15 illustrates a further different arrangement of the thrust bearing lubricating system wherein respective thrust races 20 and 21 of the front and rear thrust bearings 15 and 16 are provided with slanting oil outlets 33c and 33d, respectively, to allow the lubricating oil to directly and easily flow toward the outer circumference of the retainer ring element of the front and rear thrust bearings 15 and 16.

From the foregoing description of the embodiments of the present invention, it will be understood that the thrust bearing lubricating system of a swash plate type refrigerant compressor can provide a pair of front and rear thrust bearings indispensable for the swash plate type compressor with a sufficient and constant lubrication during the operation of the compressor. Therefore, the life of not only the thrust bearings but also the compressor, per se, can is increased.

It should be further understood that the present invention is not limited to the described embodiments, and a various modifications and changes will occur to persons skilled in the art without departing from the scope and spirit of the invention defined by the appended claims.

What is claimed:

1. A swash plate type refrigerant compressor comprising:

a cylinder block assembly having front and rear ends axially spaced apart from one another, and including therein a plurality of cylinder bores circumferentially arranged around a predetermined axis of the assembly, an axially centrally arranged swash plate chamber, and an oil sump;

a drive shaft rotatably supported in said cylinder block assembly, and having a rotating axis corresponding to said predetermined axis of said cylinder block assembly, and an axially bored main lubricating oil passageway extended substantially along said rotating axis;

a plurality of reciprocating double-headed pistons slidably fitted in said plurality of cylinder bores, and capable of implementing a pumping-in of a refrigerant gas from suction chambers into said cylinder bores, compressing of the refrigerant gas, and a discharging of the refrigerant gas after compression from said cylinder bores toward discharge chambers;

a swash plate mounted on said drive shaft to be rotated with said drive shaft for reciprocating said plurality of double-headed pistons;

a pair of front and rear thrust bearings mounted around said drive shaft and seated on axially confronting inner wall portions of said swash plate chambers of said cylinder block assembly, said pair of front and rear thrust bearings axially supporting said swash plate against a thrust force acting on said swash plate during the rotation thereof;

an oil pumping mechanism operatively connected to said drive shaft to pump a lubricating oil from said oil sump, and to flow the pumped lubricating oil into said main lubricating oil passageway of said drive shaft when driven by said drive shaft and;

a thrust bearing lubricating system having a means for supplying said pair of front and rear thrust bearings with the lubricating oil supplied from said main lubricating oil passageway of said drive shaft, said thrust bearing lubricating system comprising:

at least one first branch lubricating oil passageway means bored in said drive shaft at a position substantially corresponding to said front thrust bearing to be communicated with said main lubricating oil passageway to thereby permit the lubricating oil to be spouted therethrough from said main lubricating oil passageway toward said front thrust bearing;

at least one second branch lubricating oil passageway means bored in said drive shaft at a position substantially corresponding to said rear thrust bearing to be communicated with said main lubricating oil passageway to thereby permit the lubricating oil to be spouted therethrough from said main lubricating oil passageway toward said rear thrust bearing, and;

an arrangement wherein said first and second branch lubricating passageway means positioned axially remote from said oil pumping mechanism have different cross-sectional areas from one another adjusted to equalize an amount of the lubricating oil spouted from said first and second branch lubricating oil passageway means.

2. A swash plate type refrigerant compressor according to claim 1, wherein said first branch lubricating oil passageway means comprises a plurality of radial branch lubricating oil passageways bored in said drive shaft to be communicated with said main lubricating oil passageway.

3. A swash plate type refrigerant compressor according to claim 2, wherein each of said plurality of radial branch lubricating oil passageways has a predetermined cross-sectional area, and a total amount of said cross-sectional areas of said plurality of radial branch lubricating oil passageways of said first branch lubricating oil passageway means are larger than said cross-sectional area of said second branch lubricating oil passageway means.

4. A swash plate type refrigerant compressor according to claim 1, wherein each of said front and rear thrust bearings includes a plurality of roller elements arranged to lie in a plane vertical to said rotating axis of said drive shaft and on a circle surrounding said drive shaft, a retainer ring element for non-separably retaining said plurality of roller elements therein, and a pair of confronting thrust races between which said plurality of roller elements retained by said retainer ring element are located, and, wherein said retainer ring element of each of said front and rear thrust bearings is formed in a generally annular and non-planar member having outer and inner circumferential rims, and being bent in a cranked shape when viewing in a diametral cross-section thereof, at least one of said outer and inner rims being provided with a plurality of cuts for flowing said lubricating oil therethrough into said retainer ring element.

5. A swash plate type refrigerant compressor according to claim 1, wherein each of said front and rear thrust bearings has at least one thrust race located in the neighborhood of said swash plate, wherein at least one third branch lubricating oil passageway means is provided between said thrust race of said front thrust bearing and said swash plate, and wherein at least one fourth branch lubricating oil passageway means is provided between said thrust race of said rear thrust bearing and said swash plate.

6. A swash plate type refrigerant compressor according to claim 5, wherein said third branch lubricating oil passageway means is arranged to be in registration with said first branch lubricating oil passageway means bored in said drive shaft, and, wherein said fourth branch lubricating oil passageway means is arranged to be in registration with said second branch lubricating oil passageway means bored in said drive shaft.

7. A swash plate type refrigerant compressor according to claim 5, wherein each of said third and fourth branch lubricating oil passageway means comprises an annular spacing, and a radial oil outlet formed in one of axial opposite ends of said swash plate.

8. A swash plate type refrigerant compressor according to claim 5, wherein said each of said front and rear thrust bearings has a pair of thrust races located between said swash plate and an inner wall of said swash plate chamber, said pair of thrust races of each of said front and rear thrust bearings being fluid-tightly mounted on said drive shaft.

* * * * *